(12) United States Patent
Mi et al.

(10) Patent No.: US 6,943,930 B2
(45) Date of Patent: *Sep. 13, 2005

(54) METHOD AND SYSTEM FOR FABRICATING OPTICAL FILM USING AN EXPOSURE SOURCE AND REFLECTING SURFACE

(75) Inventors: Xiang-Dong Mi, Rochester, NY (US); David Kessler, Rochester, NY (US); Rongguang Liang, Rochester, NY (US); Tomohiro Ishikawa, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 370 days.

This patent is subject to a terminal disclaimer.

(21) Appl. No.: 10/242,564

(22) Filed: Sep. 12, 2002

(65) Prior Publication Data

US 2004/0051875 A1 Mar. 18, 2004

(51) Int. Cl.⁷ .................................... G02F 1/03
(52) U.S. Cl. ............................ 359/247; 359/249
(58) Field of Search ................... 359/247, 249, 359/251, 261; 349/123; 356/400, 399, 401

(56) References Cited

U.S. PATENT DOCUMENTS

| | | | |
|---|---|---|---|
| 4,974,941 A | 12/1990 | Gibbons et al. | |
| 5,389,698 A | 2/1995 | Chigrinov et al. | |
| 5,583,679 A | 12/1996 | Ito et al. | |
| 5,602,661 A | 2/1997 | Schadt et al. | |
| 5,604,615 A | 2/1997 | Iwagoe et al. | |
| 5,619,352 A | 4/1997 | Koch et al. | |
| 5,853,801 A | 12/1998 | Suga et al. | |
| 5,889,571 A | 3/1999 | Kim et al. | |
| 5,934,780 A | 8/1999 | Tanaka | |
| 5,936,691 A | 8/1999 | Kumar et al. | |
| 5,978,055 A | 11/1999 | VanDe Witte et al. | |
| 6,061,138 A | 5/2000 | Gibbons et al. | |
| 6,160,597 A | 12/2000 | Schadt et al. | |
| 6,190,016 B1 | 2/2001 | Suzuki et al. | |
| 6,210,644 B1 | 4/2001 | Trokhan et al. | |
| 6,292,296 B1 | 9/2001 | Choi et al. | |
| 6,295,110 B1 | 9/2001 | Ohe et al. | |
| 6,307,609 B1 | 10/2001 | Gibbons et al. | |
| 6,342,331 B2 * | 1/2002 | Oi ............................ 430/207 |
| 6,751,003 B2 * | 6/2004 | Mi ............................ 359/247 |

FOREIGN PATENT DOCUMENTS

| | | |
|---|---|---|
| EP | 684500 A2 | 5/1995 |
| EP | 1020739 A2 | 7/2000 |
| EP | 1172684 A1 | 1/2002 |
| WO | 99/53349 | 10/1999 |
| WO | 00/46634 | 8/2000 |

OTHER PUBLICATIONS

Y. Satoh, H. Mazaki, E. Yoda, T. Kaminade, T. Toyooka, and Y. Kobori; Comparison of Nematic Hybrid and Discotic Hybrid Films as Viewing Angle Compensator for NW–T-N–LCDs; SID 00 Digest; pp. 347–349.

(Continued)

*Primary Examiner*—Scott J. Sugarman
*Assistant Examiner*—Richard Hanig
(74) *Attorney, Agent, or Firm*—Nelson Adrian Blish

(57) ABSTRACT

An exposure system (5) for fabricating optical film (40) such as for photoalignment, where the optical film (40) has a photosensitive layer (20) and a substrate (10). The exposure system (5) directs an exposure beam from a light source (1) through the optical film (40), then uses a reflective surface (58) to reflect the exposure energy back through the optical film (40) to enhance or otherwise further condition the photoreaction of the photosensitive layer (20).

96 Claims, 4 Drawing Sheets

OTHER PUBLICATIONS

Y. Iimura; Prospects of the Photo–Alignment Technique for LCD Fabrications; SID 97 Digest; pp. 311–314.

M. Schadt, K. Schmitt, and V. Kozinkov; Surface–Induced Parallel Alignment of Liquid Crystals by Linearly Polymerized Photopolymers; Jpn. J. Appl. Phys. vol. 31 (1992) pp. 2155–2164.

H. Seiberle, D. Muller, G. Marck, and M. Schadt; Photo-alignment of LCoS LCDs; Journal of the SID Oct. 1, 2002, pp. 31–35.

J. Chen; Wide–Viewing–Angle Photoaligned Plastic Films for TN–LCDs; SID 99 Digest; pp. 98–101.

* cited by examiner

METHOD AND SYSTEM FOR FABRICATING OPTICAL FILM USING AN EXPOSURE SOURCE AND REFLECTING SURFACE

CROSS REFERENCE TO RELATED APPLICATIONS

Reference is made to commonly-assigned U.S. patent application Ser. No. 10/242,048 (now U.S. Pat. No. 6,751, 003), filed Sep. 12, 2002, entitled APPARATUS AND METHOD FOR SELECTIVELY EXPOSING PHOTO-SENSITIVE MATERIAL USING A REFLECTIVE LIGHT MODULATOR, by Xiang-Dong Mi, the disclosure of which is incorporated herein.

FIELD OF THE INVENTION

This invention generally relates to a method and a system for manufacturing an optical film and more particularly relates to a method and system for exposure of a photoreactive film layer, employing a reflective surface for redirecting exposure light energy back through the photoreactive film layer for improved efficiency.

BACKGROUND OF THE INVENTION

The widespread applications of optical films include such uses as polarizers, compensators, light enhancers, diffusers, substrates and protective layers, filters, and security devices. Of particular recent interest is the use of optical films as polarizers and as compensators with liquid crystal display (LCD) devices. Optical films used as polarizers adapt or condition the polarization of incident light to provide output light that is linearly, elliptically, or circularly polarized, for example. Optical films used as retarders and rotators condition light to provide suitable retardation effects.

Optical compensation films are used to improve the viewing angle characteristic of LCD displays, which describes the change in contrast ratio for different viewing angles. It is desirable that contrast be maintained over a wide range of viewing angles. One way to improve the viewing angle characteristic is to insert a compensator (also referred as compensation film, retardation film, or retarder) with proper optical properties between the polarizer and liquid crystal cell, such as disclosed in U.S. Pat. No. 5,583,679 (Ito et al.), U.S. Pat. No. 5,853,801 (Suga et al.), U.S. Pat. No. 5,619,352 (Koch et al.), U.S. Pat. No. 5,978,055 (Van De Witte et al.), and U.S. Pat. No. 6,160,597 (Schadt et al.). One widely used compensation film according to U.S. Pat. No. 5,583,679 (Ito et al.) and U.S. Pat. No. 5,853,801 (Suga et al.) is based on discotic liquid crystals which exhibit negative birefringence. This film offers improved contrast over wider viewing angles; however, it suffers larger color shift for gray level images, compared to compensators made of liquid crystalline materials having positive birefringence, according to Satoh et al. ("Comparison of Nematic Hybrid and Discotic Hybrid Films as Viewing Angle Compensator for NW-TN-LCDs" SID 2000 Digest, pp. 347–349, (2000)). To achieve comparable contrast ratio while reducing color shift, one compensation film solution, for example, as disclosed by Chen et al. ("Wide Viewing Angle Photoaligned Plastic Films" SID 99 Digest, pp. 98–101 (1999)), uses a pair of liquid crystal polymer films (LCP), treated to have orthogonally crossed optical axes, disposed on each side of a liquid crystal cell.

Types of Photoalignment Methods

In processing liquid crystal compensation films, photo-alignment methods are recognized to have advantages over earlier rubbing alignment methods. Using photo-alignment, a thin photo-reactive alignment medium, typically linear photo-polymerization media (LPP), also known as photo-oriented polymer network (PPN), is applied to a substrate and is then irradiated, typically using UV light, to provide a directional alignment bias. There are a number of photo-alignment methods, based on different photoreaction processes. In general, a photo-alignment method may be one of three basic types:

(1) Isomerization, as disclosed in U.S. Pat. No. 4,974,941 (Gibbons et al.) is a reversible process using laser light irradiation in which a monomer or single molecule is aligned using cis-trans-isomerization effects;

(2) Photo-dimerization, as disclosed in U.S. Pat. No. 5,602,661 (Schadt et al.) employs photo-induced orientation and dimerization of polymer side-chains, including cross-linking; and (3) Photo-dissociation, as taught in "Prospects of the Photo-Alignment Technique for LCD Fabrication" SID Digest 1997, pp. 311–314 (Iimura et al.) uses light to anisotropically alter an alignment medium such as polyamic acid or polyimide or copolymer comprised of amic acid and imide.

In one promising photo-dimerization method, a liquid crystal polymer (LCP) layer is applied over an LPP layer that has been treated to provide a preferred alignment orientation. As is well know in the photoalignment art, LCP materials include cross-linkable liquid crystalline monomers, oligomers, or pre-polymers having cross-linkable groups. Depending on the intended application, the cross-linkable liquid crystal material may exhibit a nematic, smectic, or cholesteric phase. Most solutions for photo-alignment using this method direct collimated, polarized UV light, at an oblique angle, onto an alignment LPP substrate to align polymer molecules in a desired direction that provides a pretilt for a subsequently applied LCP layer containing liquid crystal structures. It has been found that, for suitable performance, only a fraction of molecules in the LPP alignment layer need to be photopolymerized. Typical photoreactive LCP media include diacrylates and diepoxides and similar cross-linkable liquid crystalline materials. LCPs may have inherent positive optical anisotropy, such as with diacrylates, or negative anisotropy and weak biaxial properties, such as with discotic liquid crystal materials.

General Criteria for Photoalignment Irradiation

A number of different photo-alignment media and techniques have been used to provide the necessary pretilt orientation for different types of liquid crystal display media. For a suitable class of LPP media, optical apparatus that provides irradiation for alignment must provide the following:

1. Sufficient exposure levels, typically in the nominal range of 10–15 $mJ/cm^2$.

2. Narrow range of wavelengths. The exact range that is suitable for alignment irradiation depends on the particular photoreactive material. For example, UV-B (280–320 nm) is the preferred range for many types of photoreactive alignment layer. Some wavelengths are preferably rejected in order to minimize unwanted effects on alignment or undesirable temperature effects. For example, UV light is efficiently produced by a class of lamps that excite mercury or ion-doped mercury molecules. Such lamps typically generate UV-C (200–280 nm), UV-B (280–320 nm), UV-A (320–400 nm), visible light, and infrared light. For an embodiment where UV-B is chosen as the preferred spectral range, it would be desirable to limit the irradiance and total exposure on the web from other parts of the spectrum.

3. Uniform exposure dosage. Exposure dose is expressed in terms of energy per unit area. It has been found that dosage levels, alternately termed exposure levels, can provide acceptable alignment results even where dosage varies by as much as +/−50% across the irradiated surface area in some applications. However, reasonable dosage uniformity helps to obtain uniform alignment results, minimizing intensity level variations between levels at the middle of a substrate and at substrate edges.

4. Uniform direction of polarization. It does not appear to be important that the applied alignment radiation be highly polarized. However, for a class of LPP materials, best results are achieved when the exposure radiation has a highly uniform direction of polarization.

5. Oblique incident angles for pretilt. Typically, some deviation from normal incidence to the media is desirable in order to provide the necessary pretilt angle to the LPP material. For most applications, a broad range of incident angles is permissible, such as from 10 to 70 degrees, for example.

There have been some conventional systems developed that generally meet most of requirements 1–5 above for irradiating photoreactive alignment media on a small scale. However, it can be appreciated that these requirements become particularly difficult to meet as the irradiated surface area, or exposure zone, increases. Conventional solutions are as yet poorly suited to the demands for efficiently irradiating a web-fed photoreactive substrate, where the substrate is moved past the irradiation device at production speeds and the web width exceeds 1 m. Among the problems encountered with such systems is relatively poor light efficiency. Losses from light directing and collimating components, filters, and polarizers limit the amount of emitted light that actually reaches the photoreactive medium.

Example of Optical Film Use with LCD Display

Referring to FIG. 2, there is shown an example in which different types of optical film are used with LCD devices. In FIG. 2, a typical liquid crystal display 100 comprises a front polarizer 110a, a rear polarizer 110b, a front compensation film 120a, a rear compensation film 120b, and two liquid crystal cell substrates 130a and 130b that sandwich a switchable liquid crystal layer 140. A back light 150 provides source illumination through liquid crystal display 100 for display to a viewer 160. As is well known in the optical arts, liquid crystal display 100 may alternately include additional optical films, such as diffusive or light enhancement films, or may exclude some of the components shown in FIG. 2, such as front and rear polarizers 110a and 110b or front and rear compensation films 120a and 120b. As is also well known in the optical arts, front polarizer 110a, typically a linear polarizer, comprises a polarizing layer 112a, which can be stretched polyvinyl alcohol (PVA) film for polarizing light, between protective layers 111a and 113a, which are typically triacetate cellulose (TAC) films. Preferably, protective layer 111a, on the outer edge of liquid crystal display 100, is treated for low ultraviolet (UV) light transmittance in order to shield polarizing layer 112a from ambient UV light, such as from room lighting or sunlight. Front compensation film 120a may also include a TAC layer as a substrate 121a and an optically anisotropic layer 122a. Substrate layer 121a is then adjacent to protective layer 113a of front polarizer 110a. Alternately, substrate layer 121a could be combined with protective layer 113a as a single protective or substrate layer. Rear polarizer 110b is similar in structure to front polarizer 110a, having a polarizing layer 112b between protective layers 111b and 113b, which are typically triacetate cellulose (TAC) films. Likewise, rear compensation film 120b comprises a substrate layer 121b and an anisotropic layer 122b. Unlike protective layer 111a, however, the TAC film at substrate layer 121b is not normally selected or treated for low UV transmittance.

Prior Art Photoalignment Methods

Among proposed prior art solutions for photo-alignment are a number of scanning solutions, such as the following:

U.S. Pat. No. 5,889,571 (Kim et al.) discloses an irradiation device for scanning linearly polarized UV across a substrate to achieve alignment layer uniformity. U.S. Pat. No. 5,889,571 emphasizes the importance of oblique radiation. This solution is best suited to a substrate provided in sheet form rather than to a substrate continuously fed from a web.

U.S. Pat. No. 6,295,110 (Ohe et al.) discloses a laser light-based system for applying polarized UV radiation across a substrate having a photoreactive layer. Designed for substrates having a diagonal in the range of about 10 inches or slightly larger, U.S. Pat. No. 6,295,100 solution provides two-dimensional irradiation over an area that exceeds the size limit for the type of optical radiation employed. However, there are practical limitations in scaling this type of solution to suit a web-fed substrate having a width dimension of 1 m or larger.

It has been noted that high irradiance conditions would be beneficial for use in high-speed roll-to-roll manufacturing apparatus, particularly where it is desirable to provide a compact system. Peak irradiance on the web in such environments could range from approximately 50 milliwatts/cm$^2$ to values of several hundred milliwatts/cm$^2$. This means that average irradiance on any polarizer would be much higher. With irradiance over ranges such as might be supplied using a medium pressure long-arc Mercury lamp at power levels in the 100–600 W range, conventional, resin-based polarizers would not be well-suited. For example, this type of irradiation exceeds the practical working range of conventional polarizers such as the HNP'B—Linear Polarizer from 3M (St. Paul, Minn.). Sheet polarizers are not generally capable of handling higher irradiation levels and may quickly deteriorate over a prolonged exposure period. With this limitation in mind, prior art solutions for providing polarized irradiation over a large area include the following:

U.S. Pat. No. 6,190,016 (Suzuki et al.) discloses an irradiation apparatus using an oval focusing mirror, integrator lens, and polarizer disposed at various points in the optical system. U.S. Pat. No. 6,190,016 emphasizes the value of collimated light, incident to a polarizer, to improve polarization performance. The use of Brewster plate polarizers for large scale surfaces is disclosed.

U.S. Pat. No. 5,934,780 (Tanaka) discloses an exposure apparatus using a UV light source having an oval focusing mirror, where the apparatus includes an integrator lens, polarizer, and collimation optics. Brewster plate polarizers are used in the preferred embodiment. This type of solution may work well for a substrate up to a certain size. However, there are practical size limitations that constrain the use of Brewster plate polarizers for large substrates. Similarly, EP 1 020 739 A2 (Suzuki et al.) discloses a modified Brewster plate arrangement. As a variation on Brewster plate polarizers, EP 1 172 684 (Suzuki et al.) discloses a modified V-shaped Brewster's angle arrangement. However, similar weight and size constraints also limit the feasibility of this type of solution.

U.S. Pat. No. 6,292,296 (Choi et al.) discloses a large scale polarizer comprising a plurality of quartz segments disposed at Brewster's angle, used for a system that irradiates a photoreactive substrate using UV. However, such an arrangement would be very costly and bulky, particularly as a solution for a web-fed exposure system with a large irradiation area.

As the above-noted patent disclosures show, irradiation apparatus designed for large exposure zones have employed sizable polarization components, typically quartz or glass plates disposed at Brewster's angle. Hampered by the relative size and weight of these polarizers, such irradiation apparatus are necessarily less efficient in delivering light energy to the exposure surface. Moreover, conventional polarizers using Brewster plates or interference polarizers based on Brewster's angle principles also exhibit a high degree of angular dependency. That is, incident light must be substantially collimated in order to obtain a uniform polarized light output.

Significantly, solutions using Brewster plate polarizers such as those shown in the U.S. Pat. No. 5,934,780 (Tanaka) and U.S. Pat. Nos. 6,061,138 and 6,307,609 (Gibbons et al.) are inefficient with respect to the percentage of light energy that actually reaches the exposure zone. A substantial amount of light energy is dissipated through polarizers, filters, and uniformizing components, where used.

Light Source Options

A number of different types of light sources for photoalignment have been disclosed, for example:

WO 00/46634 (Schadt et al.) discloses a method for alignment of a substrate using an unpolarized or circularly polarized source, applied in an oblique direction.

U.S. Pat. No. 4,974,941 (Gibbons et al.) discloses alignment and realignment, preferably using a laser source.

U.S. Pat. No. 5,389,698 (Chigrinov et al.) discloses use of linearly polarized UV for photopolymer irradiation. Similarly, U.S. Pat. No. 5,936,691 (Kumar et al.) discloses use of linearly polarized UV for photopolymer irradiation, with the UV source positioned close to the substrate surface.

By and large, conventional irradiation systems for alignment are characterized by inefficient use of light. As is noted above, loss of light intensity due to filtering, polarization, and optical components, means that only a fraction of the emitted light arrives as exposure energy. For this reason, a sizable increase in light output is required in order to obtain even a modest increase in exposure energy.

Collimation

As noted above, the use of collimated or substantially collimated light is, in large part, dictated by polarizer characteristics. In related exposure processing applications for photoreactive media, collimated light is considered advantageous, as in these examples:

U.S. Pat. No. 5,604,615 and EP 0 684 500 A2 (Iwagoe et al.) disclose forming an alignment layer by directing collimated UV through slits in a photomask.

In a related curing application, U.S. Pat. No. 6,210,644 (Trokhan et al.) discloses directing UV through slatted collimator for curing resin.

U.S. Pat. Nos. 6,061,138 and 6,307,609 (Gibbons et al.) disclose a method and apparatus for alignment using exposure radiation that is "partially polarized" and "partially collimated." By "partially polarized," this disclosure identifies a broad range of S:P values from 1:100 to 100:1 with preferred range from 0.5:1 to 30:1.

By "partially collimated" these disclosures identify a broad range with a divergence, in one direction, greater than about five degrees and less than about 30 degrees. The use of such broad ranges simply seems to indicate that some significant degree of variability is acceptable for both polarization and collimation. Indeed, in practice, most polarizers work within the broad range stated in U.S. Pat. No. 6,061,138, particularly over sizable exposure zones. As is generally well known and shown in the disclosure of U.S. Pat. No. 6,190,016 (Suzuki et al.), some degree of collimation is needed simply for consistent control of polarization. Partial collimation, over the broad ranges stated in U.S. Pat. No. 6,061,138, occurs when light simply passes through an aperture and is not otherwise blocked, focused, projected, or diffused. Baffles or apertures that block stray light necessarily perform "collimation" within the ranges given in U.S. Pat. No. 6,061,138. Earlier work, disclosed in U.S. Pat. No. 5,934,780 (Tanaka) similarly shows use of partially collimated light having relatively poor polarization and the use of relatively high incident angles for exposure energy, covering the ranges specified in the '138 disclosure. Another earlier patent, EP 0 684 500 A2 (Iwagoe et al.), states that collimation of the irradiating polarized light beam is preferable, but does not require collimation.

Thus, prior art seems to indicate that collimation, considered by itself, is not as important as other characteristics of exposure radiation. Certainly, some degree of collimation is inherently necessary in order to efficiently collect and direct light onto a substrate, taking advantage of the light emitted in all directions to improve efficiency by using devices such as using reflective hoods, for example. As is noted above, some degree of collimation is necessary for polarizing light, since polarization devices are not typically equipped to handle wide variations in incident light divergence. But, taken in and of itself, collimation may have secondary importance relative to other properties of the exposure light.

Polarization

In contrast, maintaining a consistent polarization direction or azimuthal angle appears to be very important for obtaining good results for photoalignment. The direction of polymerization or selection for LC alignment materials closely corresponds to the direction of polarization. In fact, there is evidence that partial polarization, as suggested by U.S. Pat. No. 6,061,138 and as exhibited in earlier work disclosed by Schadt et al. (*Japanese Journal of Applied Physics*, Vol. 31, pp. 2155–2164) appears to be acceptable, provided that a consistent direction of polarization is maintained. The disclosure of U.S. Pat. No. 5,934,780 emphasizes the importance of this direction of polarization. It has been shown that optimal results are obtained over the exposure zone when the exposure energy is somewhat uniformly distributed and when the direction of polarization is tightly controlled to within about one degree.

As is shown in the prior art solutions cited above, achieving polarization over a broad exposure zone, with a tightly controlled direction of polarization, is particularly difficult with high intensity UV-B radiation. It is difficult to obtain a UV-B source that provides polarized UV-B light at reasonable cost. Moreover, high heat and irradiance requirements place considerable demands on filtering and polarization components. Conventional resin-based sheet polarizers are unlikely to withstand the elevated irradiance and high heat conditions. Brewster plates and interference filters can withstand heat conditions but have size and weight disadvantages as well as acceptance angle constraints.

Intensity

As a further complication, controlling the intensity of radiation energy has been proven to be difficult to achieve and to maintain as a web of photoreactive material is exposed. While tolerances may not be critical, some reasonable degree of uniformity appears to be desirable.

Cost-effective mass manufacture of photoreactive LC material requires high throughput. This necessitates using sufficient intensity levels, consistently applied to a material that is exposed and cured at fast speeds. Although conventional solutions provide some capability for high-volume web-fed manufacture, there is clearly room for improvement over prior art approaches with respect to light efficiency, processing speed, cost, and quality.

With respect to visible light, most optical films used with LCD displays are transmissive. However, not all transmissive films used for liquid crystal applications are provided on transmissive substrates. For example, optical films for liquid crystal on silicon (LCOS) devices may be fabricated on reflective substrates, as is described by H. Seiberle, D. Muller, G. Marck, and M. Schadt in the article "Photoalignment of LCOS LCDs" in *Journal of the SID*, 2002, pp. 31–35. For such devices, LPP photoalignment is complicated by the reflective substrate. Here, incident light that impinges on the LPP layer goes through the film and is reflected back up through the LPP layer, with some impact on the tilt angle achieved. For an LPP layer of 50 nm thickness, for example, about 30–40% of the incident light is reflected back through the optical film. Polarization states of reflected and incident light, although in the same plane, differ in direction, which can have the effect of decreasing tilt angle. On the other hand, the increased radiation from reflection may counteract this influence for some materials and have the opposite effect of increasing tilt angle. As the Seiberle et al. article notes, this complicates the task of photoalignment, requiring selection of an LPP material that is suitable for the effects of the reflected light. Different LPP formulations showed different results. With some LPP formulations, reflected light appeared to improve pretilt angle; other formulations showed a decrease in tilt angle with the added exposure effect.

The Seiberle et al. article acknowledges technical difficulties that must be addressed for photoalignment of a photoreactive layer on a reflective substrate and provides approaches for simulating exposure conditions in order to assess the resulting behavior of the photoreactive layer. It is instructive to observe that, using conventional thinking, the reflective effects noted in the Seiberle et al. article present a technical hurdle that must be overcome in order to obtain controlled photoalignment. This is particularly true since, for conventional reflectors, the polarization direction of reflected light differs from that of incident light. Thus, as is shown in the Seiberle et al. paper, the proposed solution is to determine which set of LPP formulations work best under conditions where light is reflected back through the LPP substrate. In terms of controlling and measuring photoalignment, then, the reflective substrate is a disadvantage, making the task of providing exposure with controlled polarization more complex when fabricating optical films. In conventional thinking, reflective effects complicate optical film fabrication and are best avoided if possible; there is no indication or suggestion to deliberately employ reflective behavior as a beneficial effect in optical film manufacture.

Notably, where reflective materials are actually used in a multilayer film containing an alignment layer, such as the holographic reflector in the identification device disclosed in international patent application WO 99/53349 (Seiberle et al.), reflective properties are not used for fabrication, but are used only to direct visible light through the alignment layer once formed.

While conventional photo-alignment methods provide significant advantages over older rubbing methods, there is considered to be room for improvement. It can be appreciated that there would be benefits to manufacturing apparatus and methods for fabrication of optical film using photo-alignment, where the exposure radiation is used to condition the response of photoreactive materials more efficiently, allowing the use of lower cost light sources that require less power and alleviating heat concerns for components within the manufacturing system.

SUMMARY OF THE INVENTION

The object of the present invention is to provide an improved system and method for light-efficient fabrication of optical film wherein a photoreactive layer is exposed as part of film fabrication. With this object in mind, the present invention provides a system for fabricating optical film, comprising:

(a) a light source which generates an incident beam of light and directs the incident beam of light through a photosensitive layer and through a substrate layer of the optical film in order to obtain a first photoreactive response within the photosensitive layer;

(b) a reflective surface disposed to reflect a transmitted portion of the incident beam of light back through the optical film, in order to obtain a second photoreactive response within the photosensitive layer; and wherein the light source and the reflective surface are on opposite sides of the optical film.

From another aspect, the present invention provides an improved method for fabricating an optical film comprising:

(a) directing a beam of light through a photosensitive layer and a substrate of the optical film to obtain a first photoreaction within the photosensitive layer; and (b) reflecting a transmitted portion of the beam of light back through the optical film as a reflected light to obtain a second photoreaction within the photosensitive layer.

A feature of the present invention is the reflection of exposure energy that would otherwise be wasted and its subsequent re-use in application to the optical film.

It is an advantage of the present invention that it improves the efficiency of conventional irradiation apparatus and methods, thereby allowing fabrication at higher speeds relative to light source power.

The method and system in accordance with the present invention reduce exposure time, reduce exposure energy, make more efficient use of light, and increase productivity for optical film fabrication. The method and system apply to exposure energy in UVA and UVB wavelengths as well as for other light wavelengths, and for both polarized and unpolarized radiation.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1A:
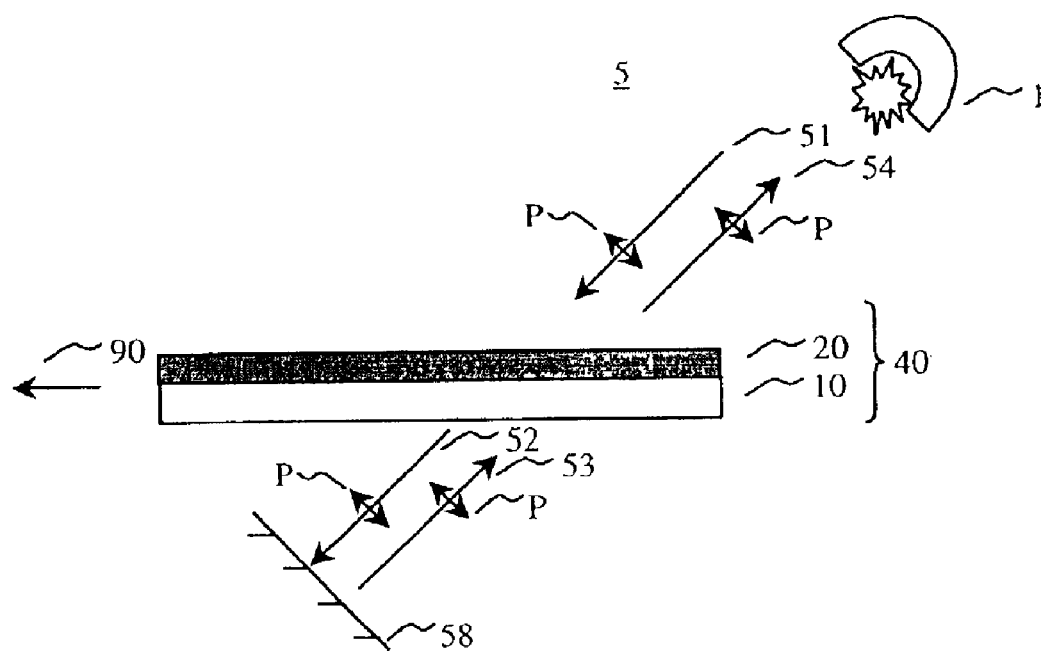
FIG. 1A shows a schematic of a system of the present invention in which an oblique incident light exposes an optical film with both incident and reflected light using a retro-reflective surface.

The present description is directed in particular to elements forming part of, or cooperating more directly with, apparatus in accordance with the invention. It is to be understood that elements not specifically shown or described may take various forms well known to those skilled in the art.

For the purposes of this application, the terms "photosensitive" and "photoreactive" are considered to be equivalent. In a preferred embodiment, the system and method of the present invention are directed to exposure of photoreactive materials in optical films used for alignment of liquid crystal polymer (LCP) layers, however, the system and methods disclosed herein can be more broadly applied to fabrication of optical films overall, wherever a layer of photosensitive material is exposed or irradiated to take advantage of a photoreaction as part of optical film manufacture.

With respect to optical films, a substrate layer must have sufficient mechanical strength to serve as a support for additional layers. In roll-to-roll web fabrication, a substrate must have sufficient strength to allow it to be wound or unwound from a roll, for example. Typical substrate materials for optical film include triacetate cellulose (TAC), polyester, polycarbonate, or other transparent polymers, with thickness typically in the 25 to 500 micrometer range. By comparison, an orientation layer or anisotropic layer comprising photoreactive material is typically less than about five micrometers thick and often less than two micrometers thick; such layers cannot be used or considered as a substrate. For the preferred embodiment, optical film is fabricated along a web in a roll-to-roll manufacturing process. However, the apparatus and methods of the present invention could be generally applied to applications using glass or other rigid material as a substrate.

In the apparatus and method of the present invention, exposure irradiation is used to condition photoreactive material for fabrication of an optical film. The term "condition," as used here, must be properly understood. In the preferred embodiment, exposure energy conditions the optical film by causing an alignment photoreaction. Typical alignment photoreactions include isomerization, photo-dimerization, and photo-dissociation, as described in the background section above. However, the method of the present invention can be used with other types of conditioning, including curing for example. For most applications, reflection of the exposure energy further conditions the photoreactive response of a photosensitive layer in an additive manner, so that reflection has an analogous effect to increasing radiation dosage. However, the reflected energy can condition the photoreactive response in some other way, including reversing or opposing the effect caused by the initial incident energy to some degree. In this way, reflection effects can be used to mediate photoreactive response in order to correct for non-uniformity or to compensate for over-reaction, for example.

As is well known in the art, optical materials may have up to three different principal indices of refraction and can be classified as either isotropic or anisotropic based on the relationship of these indices. When all three of its principal indices are equal, a material is considered to be isotropic. When anisotropic, a material can be either uniaxial, or biaxial. When two principal indices are equal, a material is considered to be uniaxial. An uniaxial material is uniquely characterized as having an ordinary index, referred as $n_o$, an extraordinary index $n_e$ and two angles describing the orientation of its optical axis, the axis of $n_e$. When $n_e$ is greater than $n_o$, an uniaxial material is positively birefringent. When $n_e$ is smaller than $n_o$, an uniaxial material is negatively birefringent. Controlling birefringent behavior is particularly useful in the fabrication and application of optical films. When all three refractive indices differ, a material is considered to be biaxial, uniquely specified by its principal indices $nx_0$, $ny_0$, $nz_0$, and three orientational angles.

Referring now to FIG. 1A, an exposure apparatus 5 according to the present invention for fabricating an optical film 40 comprises a light source 1 for providing exposure light energy and a reflective surface 58 located on an opposite side of optical film 40 from light source 1. Optical film 40 comprises a substrate 10 and a photosensitive layer 20, an LPP alignment layer in a preferred embodiment. Optical film 40 may further contain one or more additional layers including, but not limited to, additional photosensitive layers 20; each additional photosensitive layer 20 may provide a unique function with respect to any other photosensitive layer 20. Light source 1 generates an incident light beam 51 which passes through photosensitive layer 20 and through substrate 10 of optical film 40. Incident light beam 51 causes a photoreaction in photosensitive layer 20. In the preferred embodiment, incident light beam 51 polymerizes molecules in the linear photo-polymerization (LPP) material of photosensitive layer 20 as part of an alignment process.

A transmitted light beam 52 is then reflected from reflecting surface 58 and travels back, as a reflected light beam 53, through optical film 40. As it passes back through optical film 40, reflected light beam 53 provides additional exposure energy to photosensitive layer 20, which further conditions the photoreactive response. Any transmitted light beam 54, having been reflected back through substrate 10 and photosensitive layer 20, is then directed back towards light source 1 for collection and recycling towards optical film 40. An optional reflective hood (not shown) further improves light collection and direction for light source 1. Light energy from light source 1 is used more efficiently in this manner, reflected back through optical film 40 by reflective surface 58. Light source 1 could be positioned to provide incident light beam 51 at an oblique angle, as shown in FIG. 1A, or at a normal to the surface of optical film 40.

Still referring to FIG. 1A, the preferred LPP layer used as photosensitive layer 20 for optical film 40 of the preferred embodiment uses an LPP material for which reflected light beam 53 increases pretilt angle for a given level of exposure energy. Using reflective surface 58 to provide reflected light beam 53, therefore, a lower level of exposure energy from light source 1 is capable of generating the same pretilt angle as would a higher level of exposure. As a consequence, exposure apparatus 5 makes more efficient use of light, an advantage for mass production of optical films.

Reflective surface 58 can be flat or curved and can be fabricated using any of a number of materials. As a simple mirrored surface, for example, reflective surface 58 can be fabricated using metals such as aluminum, copper, silver, or gold. Alternately, a matrix of reflective elements could be provided. Curvature could be arranged to direct reflected light in order to obtain desired intensity over an exposure zone; uniformity, for example, might be enhanced by directing reflected light toward edges of optical film 40, away from the center. Conversely, it may be preferred to direct more reflected light toward the center of optical film 40 within the exposure zone. Reflective surface 58 need not necessarily span the full width of optical film 40 or its exposure zone.

Alternately, reflective surface 58 may comprise one or more reflective dielectric layers. Such dielectric layers could be birefringent, using cholesteric liquid crystal structures, for example. The dielectric layers could be fabricated to change the polarization direction of reflected light, such as from linearly to circularly polarized, for example. Alternately, dielectric layers could be fabricated to preserve the polarization direction of incident light beam 51 upon reflection.

In some applications, it may be desirable to provide some modulation of the light reflected from reflective surface 58, thereby changing the spatial characteristics of reflected light beam 53 to provide patterning effects in photosensitive layer 20. Reflective surface 58 could comprise a digital micromirror device (DMD) for selectively reflecting individual pixels over a two-dimensional surface area, thereby providing a pattern within photosensitive layer 20. Alternately, a pattern effect could be provided by modulating the polarization state of individual pixels using one or more reflective LCD spatial light modulators, or using some other suitable type of light modulation device that modulates a characteristic of reflected light, within reflective surface 58.

Figure 3:
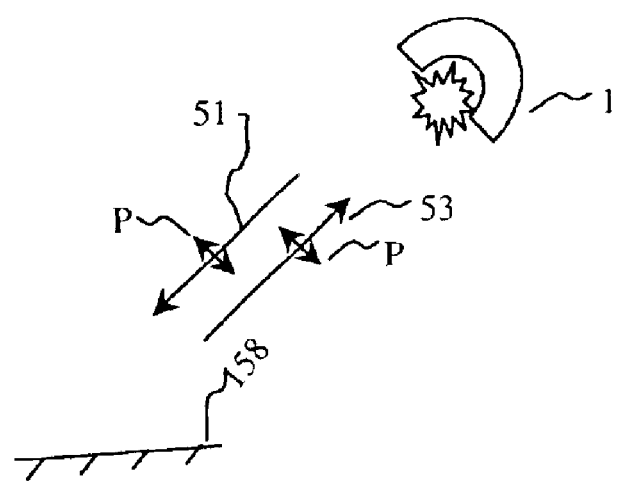
FIG. 3 is a schematic diagram illustrating the retro-reflective principle as used in the present invention.

In a preferred embodiment, reflective surface 58 is a retro-reflector. As is well known in the art, a retro-reflective surface reflects incident light back at substantially the same angle as the incident angle. FIG. 3 shows, in schematic form, the generalized behavior of a retro-reflective surface 158 with respect to incident light beam 51. With retro-reflective surface 158, reflected light beam 53 and incident light beam 51 are at generally the same angle, within a range of approximately ±5 degrees. As indicated by the P-state polarization annotation in FIG. 3, reflected light beam 53 and incident light beam 51 also have substantially the same polarization state. Thus, with use of retro-reflective surface 158, polarization effects of reflected light beam 53 complement those of incident light beam 51 for any optical film 40 placed between light source 1 and retro-reflective surface 158. An example retro-reflector is Scotchlite™ Reflective Sheeting from 3M™, St. Paul, Minn. Basically, retro-reflective sheeting uses tiny glass beads or cube corner elements to reflect light.

Referring to FIGS. 1A, 1B, 1D, and 3, the letter "P" associated with each of light beams 51, 52, 53, and 54 indicates the predominant polarization direction of the light beam. As is noted above, a mirror or dielectric coatings could be employed to maintain the polarization of incident light beam 51 when reflected.

As FIG. 1A shows, optical film 40 under exposure may be moving in a transport direction 90, such as when optical film 40 is fabricated using a web-based roll-to-roll manufacturing method. Alternately, optical film 40 can be stationary when exposed to light.

Alternate Embodiment Using Multiple Reflective Surfaces

Figure 1B:
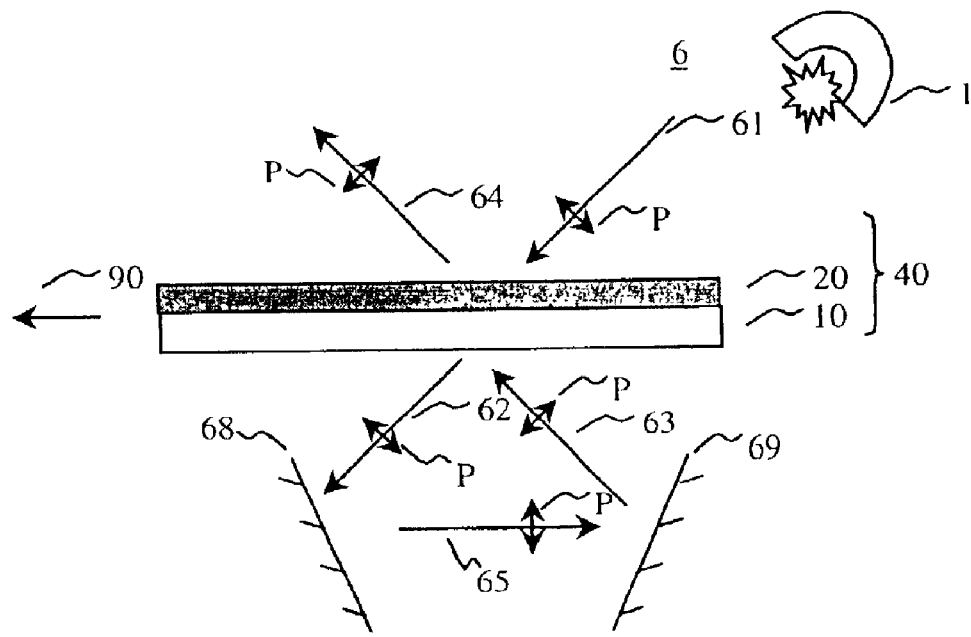
FIG. 1B shows a schematic of a system of the present invention in which an oblique incident light exposes an optical film with both incident and reflected light using two reflecting surfaces.

Referring to FIG. 1B, there is shown an alternate exposure apparatus 6 of the present invention, wherein the reflective means comprises more than one reflecting surface. In this alternate embodiment, the reflective means includes a first reflective surface 68 and a second reflective surface 69, both located opposite light source 1 relative to optical film 40. Light source 1 delivers an incident light beam 61, which passes through photosensitive layer 20 and substrate 10 of optical film 40. A transmitted light beam 62 is then reflected from first reflective surface 68 to provide a first reflected light beam 65, which is then reflected by second reflective surface 69. A second reflected light beam 63 then irradiates photosensitive layer 20 for the second time. A transmitted light beam 64 is then absorbed or recycled by other known means. In this example, second reflected light beam 63, reacting with photosensitive layer 20, has substantially the same polarization "P" as incident light beam 61. However, the propagation directions of incident light beam 61 and reflected light beam 63 are different. The angle between the two propagation directions for incident light beam 61 and reflected light beam 63 can vary between approximately 30 to 150 degrees.

As noted with reference to FIG. 1A, either or both first and second reflective surfaces 68 and 69 could be fabricated from metal or other materials, such as dielectric materials. First and second reflective surfaces 68 and 69 could be curved, could alternately employ a matrix of reflective devices, and could employ one or more spatial light modulators for suitably conditioning the reflected light.

Alternate Embodiment Using Normal Incidence and Added Layer

Figure 1C:
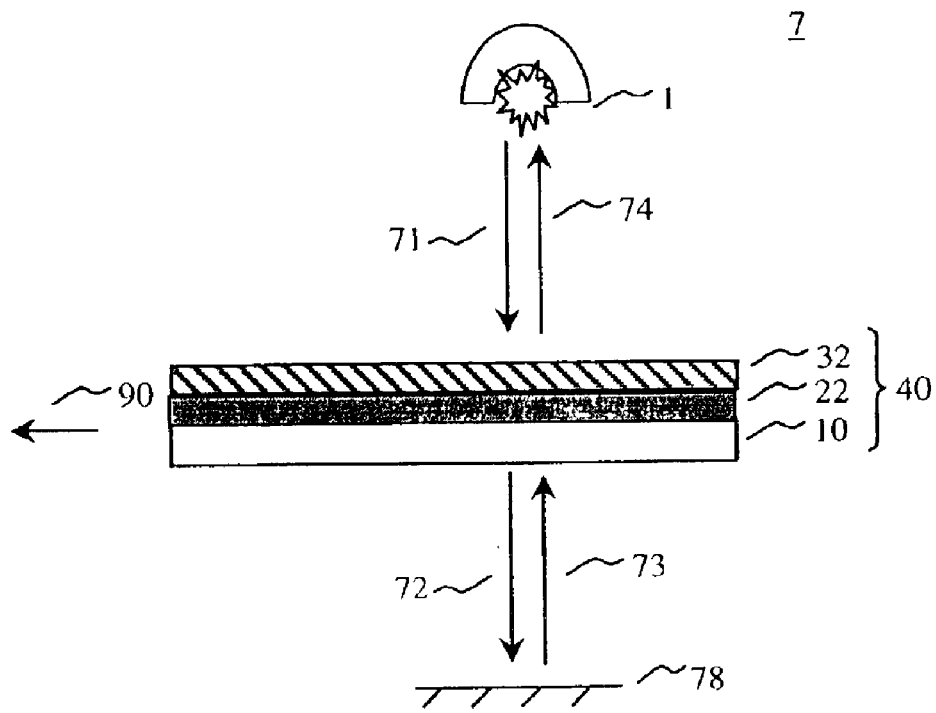
FIG. 1C shows a schematic of a system of the present invention in which a normal incident light exposes an optical film with both incident and reflected light.

Referring to FIG. 1C, there is shown another alternate embodiment for an exposure apparatus 7 that shows an alternate arrangement for incident light direction and expands upon the basic model of optical film 40 described for the preceding embodiments. Unlike exposure apparatus 5 as shown in FIG. 1A or exposure apparatus 6 as shown in FIG. 1B, an exposure apparatus 7 in FIG. 1C applies an incident light beam 71 to optical film 40 at a substantially normal incident angle, which may be preferable for some applications.

As the cross-section view of optical film 40 in FIG. 1C shows, exposure apparatus 5, 6, or 7 may be used with types of optical film 40 where the photosensitive layer treated in exposure apparatus 5, 6, or 7 is not itself an alignment layer. In the arrangement of FIG. 1C, an alignment layer 22 is provided as part of optical film 40. However, alignment layer 22 is fabricated in a separate process, such as using conventional rubbing techniques, for example. An LCP layer 32 is applied atop alignment layer 22 and is then treated in exposure apparatus 7 in order to crosslink structures within LPC layer 32, conditioned by the alignment bias of alignment layer 22.

In the example of FIG. 1C, incident light beam 71 passes through LCP layer 32, alignment layer 22, and substrate 10 of optical film 40, and becomes a transmitted light beam 72. Transmitted light beam 72 is reflected back by a reflecting surface 78. Then, a reflected light beam 73 passes back through optical film 40 a second time, reacting with LCP layer 32. The remaining light from a transmitted light beam 74 can be recycled as was described with reference to FIG. 1A.

Still referring to FIG. 1C, alignment layer 22 could be fabricated in a number of ways. Alignment layer 22 may be mechanically aligned, such as by rubbing or other techniques or using electrical, magnetic, or shear force alignment methods. Alternately, alignment layer 22 could be fabricated, in an earlier process, using exposure techniques of the present invention, but at a different wavelength than is used to treat LCP layer 32. For example, alignment layer 22 may be aligned at exposure apparatus 5 of FIG. 1A using light in the UV-B spectrum (280–320 nm). Then, LCP layer 32 is applied to the surface of optical film 40. Next, at exposure apparatus 7 of FIG. 1C, LCP layer 32 is cured using light in the UV-A spectrum (320–400 nm).

It can be appreciated that optical film 40 may comprise any number of additional layers, and that the apparatus and methods of the present invention could be used for fabricating optical film 40 having multiple alignment layers 22 interleaved with multiple LCP layers 32, and combined with other types of layers which may or may not be photosensitive, supported on substrate 10. Additional layers may be positioned on either or both sides of substrate 10. Whatever the film structure, the apparatus and method of the present invention apply for treating optical film 40 having at least one photosensitive layer 20.

Alternate Embodiment for Irradiating Multiple Films

Figure 1D:
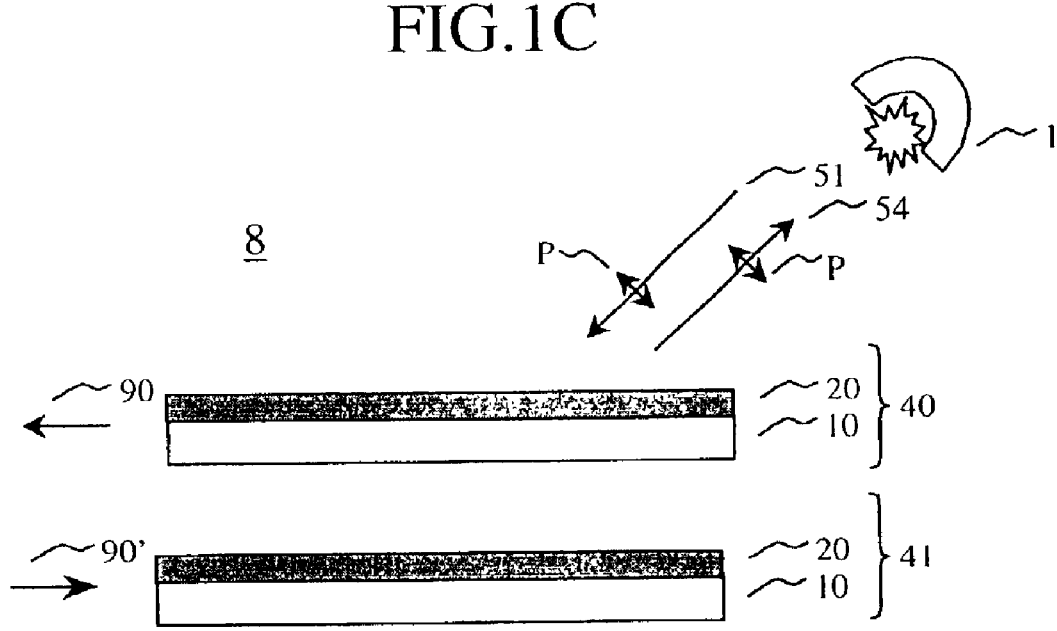
FIG. 1D shows a schematic of a system of the present invention in which an oblique incident light exposes a pair of optical films with both incident and reflected light.
Figure 1D:
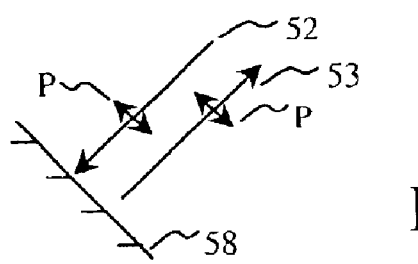
Figure 1E:
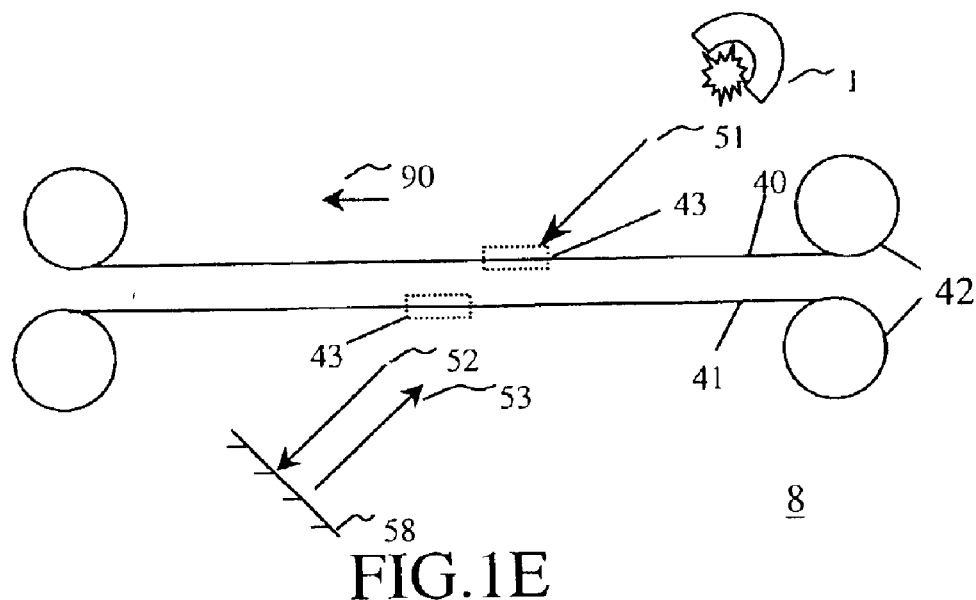
FIG. 1E shows an implementation of the system of FIG. 1D using a roll-to-roll manufacturing arrangement.
Figure 2:
FIG. 2 shows a side view diagram of an LCD display with various types of optical films.
Figure 2:
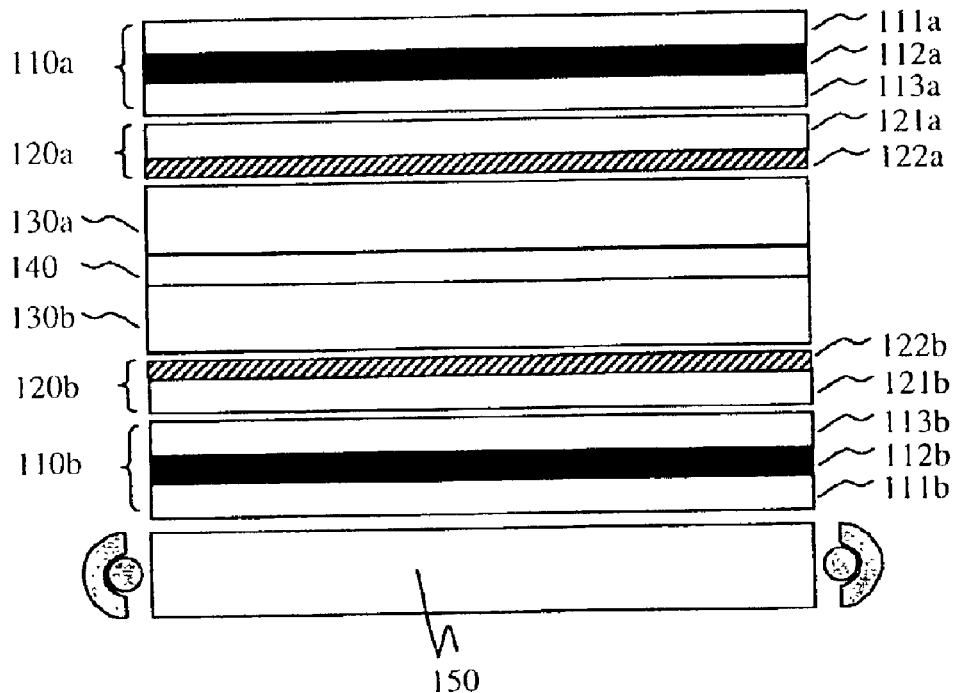

Referring to FIGS. 1D and 1E, there is shown another embodiment of the present invention. An exposure apparatus 8 can be used to irradiate two optical films 40 and 41 simultaneously, with the additional optical film 41 substantially parallel to the first optical film 40 relative to the exposure radiation. Two exposure zones 43 are defined with this arrangement, one for each optical film 40 and 41. Here, a web 42 is used for roll-to-roll manufacturing of optical films 40 and 41 and provides a standard support structure for exposure apparatus 8. Light emerging from exposure of optical film 40 is then used for exposure of optical film 41. Reflective surface 58 may be optional with this embodiment, since only a residual amount of exposure radiation may be available for reflection back through optical film 41 and even less back through optical film 40. Reflective surface 58 is shown as a retroreflector, but standard reflective behavior may alternately be employed.

As an alternate embodiment, optical films 40 and 41, as shown in FIG. 1D, could be from the same web 42, whose travel path, using techniques well known in the film fabrication arts, allows the web to receive separate exposure treatments from exposure apparatus 8. Whether or not from the same web 42, optical films 40 and 41 could be traveling in the same or in different directions, as indicated by transport directions 90 and 90' in FIG. 1D.

Composition and Orientation of Optical Film 40

It should be understood that exposure apparatus 5, 6, 7, or 8 can be used with a number of different types of photosensitive material 20, depending on the function of optical film 40. Photosensitive material 20 may be sensitive to exposure irradiation from UV light, from visible light, or even from infrared light. Depending on photosensitive material 20 response, exposure radiation from light source 1 may be coherent or incoherent, polarized, partially polarized, or un-polarized. Linearly, elliptically, or circularly polarized light may be used. Light source 1 may include an optional filter for providing light having a specific range or ranges of wavelengths. Light source 1 may alternately include a polarizer or other components necessary to produce the desired effect on photosensitive material 20. Incident light could be collimated or uncollimated; in most applications, at least some degree of collimation is preferable, within a broad range of incident angles.

In a preferred embodiment, photosensitive layer 20 comprises an LPP material that is polymerized when exposed to light. This type of photoreaction is irreversible. Alternately, photosensitive layer 20 may contain dyes which undergo cis-trans-isomerization under irradiation with linearly polarized light of an appropriate wavelength, such as those described in U.S. Pat. No. 4,974,941 (Gibbons et al.). In yet other alternative embodiments, molecules within photosensitive layer 20 may simply be crosslinked and fixed in place under exposure to unpolarized UV light. For forming some types of optical film 40, photosensitive layer 20, after exposure to light, generates a preferred direction (both in tilt and azimuthal angle) so that a liquid crystalline material in contact with irradiated photosensitive layer 20 is oriented in accordance with this preferred direction.

From the perspective of optical properties, photosensitive layer 20 can be isotropic, uniaxial, or biaxial. When photosensitive layer 20 is uniaxial, it may have positive or negative optical anisotropy. A typical LPP material, for example, is isotropic. A typical LCP material is uniaxial and positively birefringent. A typical discotic liquid crystal material is uniaxial and negatively birefringent.

Substrate 10 as described above preferably possesses a high transmittance for the specific type of incident light that is used to treat photosensitive layer 20. For example, when the incident light is UV light, substrate 10 has a high UV transmittance. Typical TAC film, without UV absorbers, has a UV transmittance of 80%–50%. By comparison, TAC film treated with UV absorbers or blockers can have reduced UV transmittance from 1%–10%.

The orientation of optical film 40 relative to light source 1 may be varied from that shown in FIGS. 1A, 1B, 1C, and 1D. That is, substrate 10 may be arranged as shown, so that photosensitive layer 20 is on the side nearest light source 1. Alternately, the relative positions of substrate 10 and photosensitive layer 20 with respect to light source 1 may be reversed. In an apparatus not using reflective surface 58, photosensitive layer 20 should typically be positioned to face light source 1. When substrate 10 has a low UV transmittance, photosensitive layer 20 should be facing light source 1 as shown in FIGS. 1A, 1B, 1C, and 1D.

Clearly, best results and maximum efficiency are obtained when exposure apparatus 5, 6, 7, or 8 is suitably matched to the sensitivity characteristics of photosensitive layer 20 in optical film 40.

The photosensitive materials used in photosensitive layer 20 for exposure apparatus 5, 6, 7, or 8 of the present invention may include any type of sensitized materials, particularly those used for photo-alignment, such as linearly photopolymerizable polymers, material comprising molecules (for example azo dyes) showing cis-trans-isomerism, materials such as polyamic acid or polyimides or copolymers comprised of amic acid and imide showing photodissociation. These photosensitive materials may be any kind of polymerizable mixture which comprises a liquid crystal monomer or pre-polymer having cross-linkable groups. For example, crosslinkable liquid crystal material comprises mixtures of multi-functionalized liquid crystal monomers and functionalized dichroic chromophores as well as mixtures of multi-functionalized liquid crystal monomers and chiral molecules, as defined in U.S. Pat. No. 5,602,661 (Schadt et al.) Depending on the intended end-use, the crosslinkable liquid crystal material may have a nematic phase or a cholesteric, smectic, or column phase.

Reflective Layer for Fabricating Optical Film 40

Figure 4:
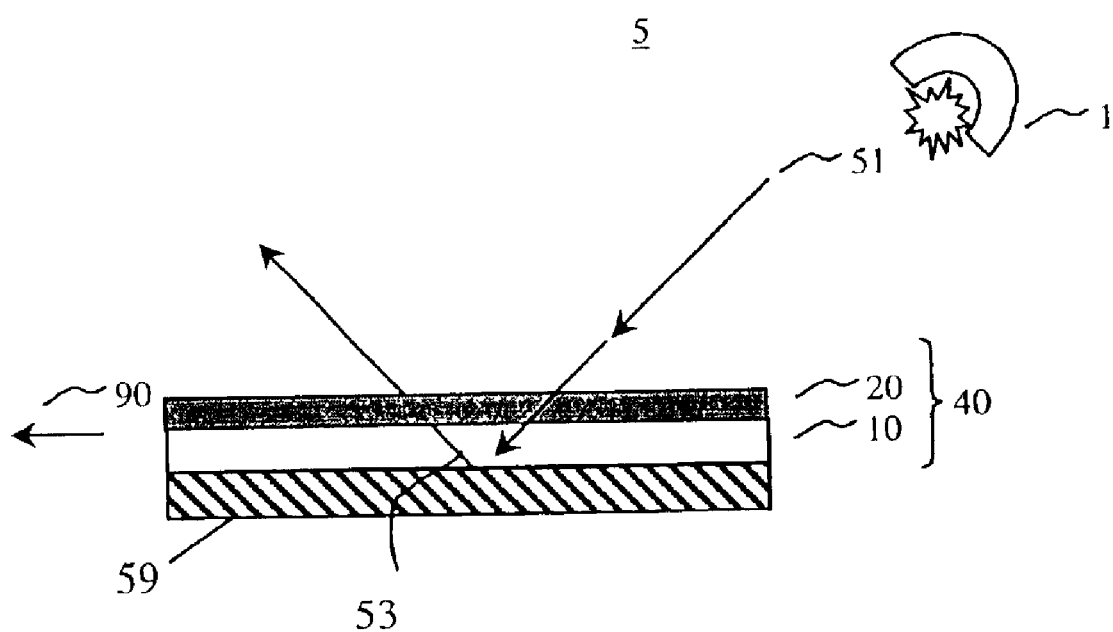
FIG. 4 is a schematic diagram showing an alternate embodiment of the present invention, with a reflective surface coupled to an optical film during fabrication.

Referring to FIG. 4, there is shown an alternate embodiment of the present invention in which a reflective layer 59 is temporarily attached to optical film 40 for fabrication. For this embodiment, reflective layer 59 is temporarily coupled to optical film 40 in order to take advantage of additional exposure radiation from reflected light beam 53 as is described above. Reflective layer 59 could be coupled to optical film 40 by adhesive means or by static attraction, for example. This would enable reflective layer 59 to be coupled to optical film 40 before and during exposure and removed at some time after optical film 40 is exposed. Removal of reflective layer 59 could be performed shortly following exposure or at some later time. For example, reflective layer 59 could even serve as additional support for optical film 40, such as for protection during shipping, handling, and storage.

As was noted above, the incident and reflected energy applied to optical film 40 may be additive or complementary, so that the reflected energy, by a contributory photoreaction, enhances the effect of the incident energy. However, reflected energy can alternately be used to reverse or oppose the photoreaction of the incident energy, depending on response characteristics of photosensitive layer 20 to the reflected energy, thereby mediating the exposure photoreaction.

The invention has been described in detail with particular reference to certain preferred embodiments thereof, but it will be understood that variations and modifications can be effected within the scope of the invention. Therefore, what is provided is an improved apparatus and method for manufacturing an optical film having a photoreactive film layer by employing a reflective surface for redirecting exposure light energy back through the photoreactive film layer.

PARTS LIST

1 Light source
5 Exposure apparatus
6 Exposure apparatus
7 Exposure apparatus
8 Exposure apparatus
10 Substrate
20 Photosensitive layer
22 Alignment layer
32 LCP layer
40 Optical film
41 Optical film
42 Web
43 Exposure zone
51 Incident light beam
52 Transmitted light beam
53 Reflected light beam
54 Transmitted light beam
58 Reflective surface
59 Reflective layer
61 Incident light beam
62 Transmitted light beam
63 Second reflected light beam
64 Transmitted light beam
65 First reflected light beam
68 First reflective surface
69 Second reflective surface
71 Incident light beam
72 Transmitted light beam
73 Reflected light beam
74 Transmitted light beam
78 Reflecting surface
90, Transport direction
90' Transport direction
100 Liquid crystal display
110a Front polarizer
110b Rear polarizer
111a Protective layer
111b Protective layer
112a Polarizing layer
112b Polarizing layer
113a Protective layer
113b Protective layer
120a Front compensation film
120b Rear compensation film
121a Substrate layer
121b Substrate layer
122a Anisotropic layer
122b Anisotropic layer
130a Liquid crystal cell substrate
130b Liquid crystal cell substrate
140 Liquid crystal layer
150 Back light
158 Retro-reflective surface
160 Viewer

What is claimed is:

1. A system for fabricating optical film, comprising:
   (a) a light source which generates an incident beam of light and directs said incident beam of light through a photosensitive layer and through a substrate layer of the optical film in order to obtain a first photoreactive response within said photosensitive layer;
   (b) a reflective surface disposed to reflect a transmitted portion of said incident beam of light back through the optical film, in order to obtain a second photoreactive response within said photosensitive layer;
   wherein said light source and said reflective surface are on opposite sides of the optical film; and
   wherein said photosensitive layer is positively birefringent.

2. A system according to claim 1 wherein said photosensitive layer is a linear photo-polymerization medium.

3. A system according to claim 1 wherein said first photoreactive response comprises isomerization.

4. A system according to claim 1 wherein said first photoreactive response comprises photo-dimerization.

5. A system according to claim 1 wherein said first photoreactive response comprises photo-dissociation.

6. A system according to claim 1 wherein said second photoreactive response enhances said first photoreactive response.

7. A system according to claim 1 wherein said second photoreactive response opposes said first photoreactive response.

8. A system for fabricating optical films as in claim 1 wherein said light source provides UV light.

9. A system according to claim 1 wherein said incident beam of light is directed at an oblique angle with respect to the surface of the optical film.

10. A system according to claim 1 wherein said incident beam of light is directed at a normal angle with respect to the surface of the optical film.

11. A system according to claim 1 wherein said incident beam of light is substantially polarized.

12. A system according to claim 1 wherein said incident beam of light is substantially collimated.

13. A system according to claim 1 wherein said incident beam of light is unpolarized.

14. A system according to claim 1 wherein said reflective surface is retro-reflective.

15. A system according to claim 1 wherein said reflective surface preserves the polarization direction of said incident beam of light.

16. A system according to claim 1 wherein said reflective surface is coupled to said substrate.

17. A system according to claim 1 wherein said reflective surface is spaced apart from said substrate.

18. A system according to claim 1 wherein said light source further comprises a reflective hood for collecting and redirecting light.

19. A system according to claim 1 further comprising transport means for moving said optical film through an exposure zone.

20. A system according to claim 1 wherein the optical film further comprises at least one additional photosensitive layer.

21. A system according to claim 1 wherein said reflective surface is metal.

22. A system according to claim 1 wherein said reflective surface comprises a plurality of dielectric layers.

23. A system according to claim 1 wherein said reflective surface is retro-reflective.

24. A system according to claim 1 wherein said reflective surface is curved.

25. A system according to claim 1 wherein said reflective surface comprises a matrix of reflective elements.

26. A system for fabricating optical film as in claim 1 wherein said substrate has a UV transmittance in excess of about 50%.

27. A system for fabricating optical film as in claim 1 wherein said photosensitive layer is LCP.

28. A system according to claim 1 wherein the optical film further comprises at least one additional layer.

29. A system according to claim 1 wherein said reflective surface comprises a spatial light modulator.

30. A system according to claim 29 wherein said spatial light modulator is from the group consisting of digital micromirror device, liquid crystal device.

31. A system for fabricating optical film, comprising:
(a) a light source which generates an incident beam of light and directs said incident beam of light through a photosensitive layer and through a substrate layer of the optical film in order to obtain a first photoreactive response within said photosensitive layer;
(b) a reflective surface disposed to reflect a transmitted portion of said incident beam of light back through the optical film, in order to obtain a second photoreactive response within said photosensitive layer;
wherein said light source and said reflective surface are on opposite sides of the optical film; and
wherein said photosensitive layer is negatively birefringent.

32. A system for fabricating optical film, comprising:
(a) a light source which generates an incident beam of light and directs said incident beam of light through a photosensitive layer and through a substrate of the optical film in order to obtain a first photoreactive response within said photosensitive layer;
(b) a first reflective surface disposed to reflect a transmitted portion of said incident beam of light for re-use, as a first reflected light beam; and
(c) a second reflective surface disposed to reflect said first reflected light beam in order to direct a second reflected light beam back through the optical film, in order to obtain a second photoreactive response.

33. A system according to claim 32 wherein said photosensitive layer is a linear photo-polymerization media.

34. A system according to claim 32 wherein said first photoreactive response comprises isomerization.

35. A system according to claim 32 wherein said first photoreactive response comprises photo-dimerization.

36. A system according to claim 32 wherein said first photoreactive response comprises photo-dissociation.

37. A system according to claim 32 wherein said second photoreactive response enhances said first photoreactive response.

38. A system according to claim 32 wherein said second photoreactive response opposes said first photoreactive response.

39. A system according to claim 32 wherein said light source provides UV light.

40. A system according to claim 32 wherein said incident beam of light is directed at an oblique angle with respect to the surface of the optical film.

41. A system according to claim 32 wherein said incident beam of light is substantially polarized.

42. A system according to claim 32 wherein said incident beam of light is substantially collimated.

43. A system according to claim 32 wherein said incident beam of light is unpolarized.

44. A system according to claim 32 wherein said second reflective surface preserves the polarization direction of said incident beam of light.

45. A system according to claim 32 wherein said light source further comprises a reflective hood for collecting and redirecting light.

46. A system according to claim 32 further comprising transport means for moving said optical film through an exposure zone.

47. A system according to claim 32 wherein the optical film further comprises at least one additional photosensitive layer.

48. A system according to claim 32 wherein said first reflective surface is metal.

49. A system according to claim 32 wherein said first reflective surface comprises a plurality of dielectric layers.

50. A system according to claim 32 wherein said first reflective surface is curved.

51. A system according to claim 32 wherein said first reflective surface comprises a matrix of reflective elements.

52. A system for fabricating optical film as in claim 32 wherein said substrate has a UV transmittance in excess of about 50%.

53. A system for fabricating optical film as in claim 32 wherein said photosensitive layer is LCP.

54. A system for fabricating optical film as in claim 32 wherein said photosensitive layer is positively birefringent.

55. A system for fabricating optical film as in claim 32 wherein said photosensitive layer is negatively birefringent.

56. A system for fabricating optical films as in claim 32 wherein the optical film comprises at least one additional layer.

57. A system according to claim 32 wherein said first reflective surface comprises a spatial light modulator.

58. A system according to claim 57 wherein said spatial light modulator is from the group consisting of digital micromirror device, liquid crystal device.

59. A system according to claim 32 wherein said second reflective surface comprises a spatial light modulator.

60. A system according to claim 59 wherein said spatial light modulator is from the group consisting of digital micromirror device, liquid crystal device.

61. A system for simultaneously exposing optical film over a first exposure zone and a second exposure zone, wherein the optical film comprises a photosensitive layer and a substrate, the system comprising:
(a) a first support structure for defining the first exposure zone;
(b) a second support structure for defining the second exposure zone;
(c) a light source which directs an incident beam of light toward the first exposure zone in order to obtain a first photoreaction from the optical film, a transmitted portion of said incident beam of light then impinging on the optical film over a second exposure zone in order to obtain a second photoreaction; and
wherein said photosensitive layer is a linear photo-polymerization media.

62. A system according to claim 61 wherein said first photoreactive response comprises isomerization.

63. A system according to claim 61 wherein said first photoreactive response comprises photo-dimerization.

64. A system according to claim 61 wherein said first photoreactive response comprises photo-dissociation.

65. A system for fabricating optical films as in claim 61 wherein said light source provides UV light.

66. A system according to claim 61 wherein said incident beam of light is directed at an oblique angle with respect to the surface of the optical film.

67. A system according to claim 61 wherein said incident beam of light is directed at a normal angle with respect to the surface of the optical film.

68. A system according to claim 61 wherein said incident beam of light is substantially collimated.

69. A system according to claim 61 wherein said incident beam of light is unpolarized.

70. A system according to claim 61 further comprising a reflective surface for reflecting a portion of light transmitted through the second exposure zone back toward the second exposure zone.

71. A system according to claim 70 wherein said reflective surface is retro-reflective.

72. A system according to claim 70 wherein said reflective surface preserves the polarization direction of said incident beam of light.

73. A system according to claim 61 wherein said light source further comprises a reflective hood for collecting and redirecting light.

74. A system according to claim 61 further comprising transport means for moving said optical film through the first and second exposure zones.

75. A system according to claim 61 wherein the optical film further comprises at least one additional layer.

76. A system according to claim 70 wherein said reflective surface is metal.

77. A system according to claim 70 wherein said reflective surface comprises a plurality of dielectric layers.

78. A system according to claim 70 wherein said reflective surface is retro-reflective.

79. A system for fabricating optical film as in claim 61 wherein said substrate has a UV transmittance in excess of about 50%.

80. A system for fabricating optical film as in claim 61 wherein said photosensitive layer is LCP.

81. A system for fabricating optical film as in claim 61 wherein the optical film comprises at least one additional photosensitive layer.

82. A system for fabricating optical film as in claim 61 wherein said photosensitive layer is positively birefringent.

83. A system for fabricating optical film as in claim 61 wherein said photosensitive layer is negatively birefringent.

84. A system according to claim 70 wherein said reflective surface comprises a spatial light modulator.

85. A system according to claim 84 wherein said spatial light modulator is from the group consisting of digital micromirror device, liquid crystal device.

86. A system for simultaneously exposing optical film over a first exposure zone and a second exposure zone, wherein the optical film comprises a photosensitive layer and a substrate, the system comprising:
(a) a first support structure for defining the first exposure zone;
(b) a second support structure for defining the second exposure zone;
(c) a light source which directs an incident beam of light toward the first exposure zone in order to obtain a first photoreaction from the optical film, a transmitted portion of said incident beam of light then impinging on the optical film over a second exposure zone in order to obtain a second photoreaction; and
wherein said incident beam of light is substantially polarized.

87. A method for fabricating an optical film, comprising:
(a) coupling a temporary reflective backing to the optical film; and
(b) directing a light beam through a photosensitive layer of the optical film in order to obtain a first photoreactive response within said photosensitive layer, said temporary reflective backing reflecting a portion of said beam of light that has passed through said photosensitive layer back through the optical film, in order to obtain a second photoreactive response.

88. A method for fabricating an optical film according to claim 87 further comprising the step of:
(c) decoupling said temporary reflective backing from said optical film.

89. A method for fabricating an optical film according to claim 87 wherein the step of coupling said temporary reflective backing to the optical film comprises the step of applying an adhesive.

90. A method for fabricating an optical film according to claim 87 wherein the step of coupling said temporary reflective backing to the optical film employs static attraction.

91. A method for fabricating an optical film according to claim 87 wherein the step of directing a light beam comprises the step of directing a polarized light beam.

92. A method for fabricating an optical film according to claim 87 wherein the step of directing a light beam comprises the step of directing an unpolarized light beam.

93. A method for fabricating an optical film according to claim 87 wherein the step of directing a light beam comprises the step of directing a UV light beam.

94. A method for fabricating an optical film as in claim 87 wherein said photosensitive layer comprises a linear photo-polymerization medium.

95. A method for simultaneously exposing a first and second segment of optical film, wherein the optical film comprises a photosensitive layer and a substrate, the method comprising:
(a) providing a light source which generates a beam of exposure radiation;
(b) defining a first exposure zone on said first segment of optical film, onto which said beam of exposure radiation is incident for exposing said photosensitive layer on said first segment of optical film;

(c) defining a second exposure zone on said second segment of optical film, onto which said beam of exposure radiation, after passing through said first segment of optical film, is incident for exposing said photosensitive layer on said second segment of optical film; and (d) providing a reflective surface for reflecting residual transmitted light from said beam of exposure radiation after passing through said second segment of optical film in order to direct a reflected light beam back through said second segment of optical film.

96. A method for simultaneously exposing a first and second segment of optical film according to claim 95 wherein the step of defining a first exposure zone comprises the step of supporting said first segment of optical film on a web.

* * * * *